United States Patent
Kim et al.

(10) Patent No.: US 7,242,136 B2
(45) Date of Patent: Jul. 10, 2007

(54) FRONT FILTER, AND PLASMA DISPLAY APPARATUS HAVING THE SAME

(75) Inventors: Young Sung Kim, Yongin-si (KR); Kyung Ku Kim, Seoul (KR); Hong Rae Cha, Seoul (KR); Myeong Soo Chang, Oeiwhang-si (KR); Byung Gil Ryu, Seoul (KR); Eun Ho Yoo, Goyang-si (KR)

(73) Assignee: LG Electronics Inc., Seoul (KR)

( * ) Notice: Subject to any disclaimer, the term of this patent is extended or adjusted under 35 U.S.C. 154(b) by 334 days.

(21) Appl. No.: 10/796,102

(22) Filed: Mar. 10, 2004

(65) Prior Publication Data

US 2004/0178729 A1   Sep. 16, 2004

(30) Foreign Application Priority Data

Mar. 11, 2003   (KR) ............... 10-2003-0015174

(51) Int. Cl.
*G06F 3/033* (2006.01)
*G09F 9/00* (2006.01)
*H01J 61/40* (2006.01)

(52) U.S. Cl. ............... 313/112; 313/582; 359/885; 359/577

(58) Field of Classification Search ........ 345/173–178; 178/18.01–20.06
See application file for complete search history.

(56) References Cited

U.S. PATENT DOCUMENTS

| | | | | |
|---|---|---|---|---|
| 4,794,634 A | * | 12/1988 | Torihata et al. | 379/93.19 |
| 6,061,177 A | * | 5/2000 | Fujimoto | 359/443 |
| 6,087,012 A | * | 7/2000 | Varaprasad et al. | 428/428 |
| 6,215,477 B1 | * | 4/2001 | Morrison et al. | 345/173 |
| 6,876,355 B1 | * | 4/2005 | Ahn et al. | 345/173 |
| 6,887,631 B2 | * | 5/2005 | Kiguchi et al. | 430/7 |
| 6,933,086 B2 | * | 8/2005 | Sakurada | 430/7 |
| 7,053,886 B2 | * | 5/2006 | Shin | 345/173 |
| 2003/0122801 A1 | * | 7/2003 | Yu | 345/173 |
| 2005/0062410 A1 | * | 3/2005 | Bell et al. | 313/506 |

FOREIGN PATENT DOCUMENTS

JP   10-163671   *   6/1998

* cited by examiner

*Primary Examiner*—Ashok Patel
(74) *Attorney, Agent, or Firm*—Ked & Associates, LLP.

(57) ABSTRACT

The present invention relates to a front filter having a touch screen, and a plasma display apparatus having the same. The front filter installed on a front surface of a panel of a plasma display apparatus, the front filter including: a touch screen for generating a coordinate signal with respect to a touch point.

22 Claims, 9 Drawing Sheets

| 30 | |
|---|---|
| Non-reflective | 50 |
| Optical characteristic film | 52 |
| Glass | 54 |
| EMI shield film | 56 |
| NIR shield film | 58 |

FRONT FILTER, AND PLASMA DISPLAY APPARATUS HAVING THE SAME

BACKGROUND OF THE INVENTION

1. Field of the Invention

The present invention relates to a plasma display apparatus, and more particularly, to a front filter having a touch screen, and a plasma display apparatus having the same.

2. Description of the Related Art

Plasma display panel (hereinafter referred to as "PDP") generally displays an image including character or graphic by generating light from fluorescent substance using ultraviolet rays with a wavelength of 147 nm, which is generated during a gas discharge of an inert mixture gas, such as He+Xe, Ne+Xe, He+Ne+Xe or the like. This PDP has easy slimness and large-sized characteristics, and provides a greatly improved picture quality thanks to the recent technology development. Especially, three-electrode alternating current (AC) surface discharge type PDP has advantages of a low voltage operation and a long life since wall charges stored on a surface in the course of discharge protect electrodes from sputtering generated by the discharge.

FIG. 1 is a view illustrating a discharge cell of a conventional three-electrode alternating current (AC) surface discharge type plasma display panel.

Referring to FIG. 1, a discharge cell of the three-electrode AC surface discharge type PDP includes a scan electrode (Y) and a sustain electrode (Z) formed on an upper substrate 10, and an address electrode (X) formed on a lower substrate 18. Each of the scan electrode (Y) and the sustain electrode (z) includes transparent electrodes 12Y and 12Z and metal bus electrodes 13Y and 13Z having line widths narrower than line widths of the transparent electrodes 12Y and 12Z formed at one-sided edge regions of the transparent electrodes 12Y and 12Z.

The transparent electrodes 12Y and 12Z are generally formed of Indium-Tin-Oxide (Hereinafter, referred to as "ITO") on the upper substrate 10. The metal bus electrodes 13Y and 13Z are generally formed of chrome (Cr) on the transparent electrodes 12Y and 12Z to function to reduce a voltage drop caused by the transparent electrodes 12Y and 12Z having high resistance. An upper dielectric layer 14 and a passivation film 16 are layered on the upper substrate 10 having the scan electrode (Y) and the sustain electrode (z) formed in parallel with each other. The wall charge generated at the time of plasma discharge is stored in the upper dielectric layer 14. The passivation film 16 prevents the upper dielectric layer 14 from being damaged due to the sputtering generating at the time of the plasma discharge and also, enhances an emission efficiency of a secondary electron. Magnesium oxide (Mgo) is generally used as the passivation film 16. A lower dielectric layer 22 and a barrier 24 are formed on the lower substrate 18 having the address electrode (X), and a fluorescent layer 26 is coated on a surface of the lower dielectric layer 22 and the barrier 24. The address electrode (X) is formed in a direction of crossing with the scan electrode (Y) and the sustain electrode (Z). The barrier 24 is formed in parallel with the address electrode (X) to prevent the visible ray and the ultraviolet ray caused by the discharge from being leaked to an adjacent discharge cell. The fluorescent layer 26 is excited by the ultraviolet ray generated due to the plasma discharge to radiate any one visible ray of red, green or blue. The inert mixed gas for the discharge such as He+Xe, Ne+Xe, He+Ne+Xe and the like is injected into a discharge space of the discharge cell provided between the upper/lower substrates 10 and 18 and the barrier 24.

In the PDP, one frame is divided for time-division driving into several sub-fields having different light-emitting times so as to embody a gray level of the image. Each of the sub-fields is divided into a reset period for which an entire screen is initialized, an address period for which a scan line is selected and a specific cell is selected at the selected scan line, and a sustain period for which the gray level is embodied depending on the light-emitting times.

For example, in case that the image is expressed using a 256 gray level as in FIG. 2, a frame period (16.67 ms) corresponding to 1/60 second is divided into eight sub-fields (SF1 to SF8). Also, each of the eight sub-fields (SF1 to SF8) is again divided into a reset period, an address period and a sustain period. Herein, the reset and address periods of each sub-field are identical every sub-field, while as the sustain period is increased in a ratio of $2^n$ (n=0, 1, 2, 3, 4, 5, 6, 7) at each of the sub-fields.

In the above-driven PDP, a front filter for shielding an electronic wave and also preventing an external light from being reflected is installed on a front surface of the upper substrate 10.

FIG. 3 is a schematic section view illustrating a portion of a conventional plasma display apparatus.

Referring to FIG. 3, the conventional plasma display apparatus includes a panel 32 where the upper substrate 10 and the lower substrate 18 are attached to each other with a gap therebetween, a front filter 30 installed at a front surface of the panel 32, a chassis base 36 for supporting the panel 32 and also mounting a printed circuit board thereon, a heat sink plate 34 attached to a front surface of the chassis base 36, a back cover 38 installed on a rear surface of the panel 32, and a front cabinet 45 for electrically connecting the back cover 38 and the front filter 30.

The front cabinet 45 includes a filter support portion 40 for electrically connecting the front filter 30 and the back cover 38, and a support member 42 for fixing and supporting the front filter 30 and the back cover 38. The filter support portion 40 supports the front filter 30 such that a rear surface of the front filter 30 is spaced away from the panel 32. Further, the filter support portion 40 electrically connects the EMI shield film included in the front filter 30 to the back cover 38 grounded to a ground voltage source to discharge an EMI signal from the EMI shield film. Also, the filter support portion 40 prevents the EMI from being laterally emitted.

The printed circuit board mounted on the chassis base 36 supplies a driving signal to electrodes (for example, a scan electrode, a sustain electrode and an address electrode) of the panel 32. For this, the printed circuit board includes various driving portions not shown. The panel 32 displays a certain image in response to the driving signal supplied from the printed circuit board. The heat sink plate 34 dissipates heat generated from the panel 32 and the printed circuit board. The back cover 38 protects the panel 32 from an external impact, and also shields an electromagnetic interference (Hereinafter, referred to as "EMI") laterally emitted.

The front filter 30 shields the EMI and also, prevents an external light from being reflected. For this, the front filter 30 includes a antireflection coating 50, an optical characteristic film 52, a touch screen 56, and a near infrared ray (Hereinafter, referred to as "NIR") shield film 58. Herein, an adhesive layer is formed between respective films 50, 52, 56 and 58 of the front filter 30 to adhere respective films 50, 52, 56 and 58 to one another. Generally, a specific substance is added to the adhesive layer to form the optical characteristic film 52. At this time, a structure of the front filter is a little varied depending on a manufacture enterprise.

The antireflection coating 50 prevents an external incident light from being reflected toward an external to improve a contrast of a plasma display panel (PDP). The antireflection coating So is formed on a surface of the front filter 30. Meanwhile, the antireflection coating 50 can be additionally formed on a rear surface of the front filter 30.

The optical characteristic film 52 functions to decrease brightness of red (R) and green (G) of visible ray incident from the panel, while it functions to increase brightness of blue (B) to improve an optical characteristic of the PDP.

The glass 54 prevents the front filter 30 from being damaged by the external impact. That is, the glass 54 supports the front filter 30 to prevent the front filter 30 from being damaged by the external impact.

The EMI shield film 56 shields the EMI to prevent the EMS incident from the panel 32 from being emitted to the external. In the above structure of the EMI shield film 56, a plurality of first electrode lines 61a and a plurality of second electrode lines 61b are crossed with one another for an integral structure. Since the plurality of electrode lines is finely constructed like a black matrix, it does not influence the picture quality.

The NIR shield film 58 shields a NIR (Near Infrared Ray) emitted from the panel 32 to prevent the NIR exceeding a reference value from being emitted toward the external such that a signal transmitting device using IR (Infrared Ray) can normally transmit a signal such as a remote controller and the like. Meanwhile, the EMI shield film 56 and the NIR shield film 58 can be constructed as one layer.

As shown in FIG. 6, the front filter 30 is electrically connected with the back cover 38 through the filter support portion 40. Describing this in detail, the filter support portion 40 is connected to the rear surface of the front filter 30 at one end of the front filter 30. At this time, the filter support portion 40 is electrically connected with at least one of the EMI shield film 56 and the NIR shield film 58. That is, the filter support portion 40 connects the front filter 30 to the back cover 38 to shield the EMI and/or the NIR.

The conventional front filter 30 uses the glass 54 so as to prevent the front filter 30 from being damaged by the external impact. This front filter is called a glass typed front filter. However, if the glass 54 is inserted into the front filter 30, there is a disadvantage in that the front filter 30 is thickened. Further, if the glass 54 is inserted into the front filter 30, there is a drawback in that the front filter 30 is increased in weight and also a manufacture cost.

In order to solve the above drawback, the front filter without the glass has been proposed.

On the other hand, as means for inputting any command on a screen of a display device, a touch screen is widely used.

FIG. 7 is a view illustrating a structure of a conventional touch screen.

The touch screen 70 includes an upper film 72 forming a first transparent conductive layer 74 thereon, and a lower film 76 forming a second transparent conductive layer 78 thereon and being spaced away from the upper film 72.

The upper film 72 and the lower film 76 are united by a sealant 73 coated along an edge portion being a non-touch area and are spaced away from each other as much as a height of the sealant 73. Further, a plurality of spacers (not shown) (for example, dot spacer and the like) is additionally formed on the first transparent conductive layer 74 of the upper film 72 or the second transparent conductive layer 78 of the lower film 76 at a touch area excepting for the non-touch area to separate the upper film 72 from the lower film 76.

A transparent film formed of polyethylene terephthalate (PET) is mainly used as the upper film 72 pressed by a pen or a finger, and a transparent film formed of a material like the upper film 72 is used as the lower film 76. As first and second transparent conductive layers 74 and 78, any one of ITO (Indium-Tin-Oxide), IZO (Indium-Zinc-Oxide) and ITZO (Indium-Tin-Zinc-Oxide) is used.

If the first transparent conductive layer 74 is in contact with the second transparent conductive layer 78 by the upper film 72 pressed by the pen or the finger, a resistance value of the touch screen 70 is varied depending on its contact position. Additionally, since current or voltage is different depending on the varied resistance value, the touch screen 70 output the varied current or voltage as an X-axis coordinate signal through an X electrode bar 75, that is, fist and second X electrode bars 75A and 75B connected to the first transparent conductive layer 74, and outputs as a Y-axis coordinate signal through a Y electrode bar 79, that is, first and second Y electrode bar 79A and 79B connected to the second transparent conductive layer 78. In this case, the touch screen 70 sequentially outputs the X-axis coordinate signal and the Y-axis coordinate signal under control of a touch screen controller (not shown).

As described above, the front filter of the PDP performs an electromagnetic wave shielding function, a color adjustment function, a near infrared absorption function and the like. The touch screen performs a computer function, a home networking function, an automatic power-off function, an internet function and the like.

Accordingly, if the above touch screen is equipped with the plasma display apparatus, the plasma display apparatus does not require an external separate input device, and further can not only appeal to consumer's mentality, but also can enhance a value of a high-class brand.

SUMMARY OF THE INVENTION

Accordingly, the present invention is directed to a front filter, and a plasma display apparatus having the same, that substantially obviate one or more problems due to limitations and disadvantages of the related art.

An object of the present invention is to provide a front filter with a touch screen, and a plasma display apparatus having the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a front filter installed on a front surface of a panel of a plasma display apparatus, the front filter including: a touch screen for generating a coordinate signal with respect to a touch point.

At this time, the touch screen can shield electromagnetic interference (EMI). Further, the front filter is preferably a film type filter.

According to the inventive the front filter, the touch screen can include: an upper film on which a plurality of first electrode lines are formed; a lower film on which a plurality of second electrode lines crossing the plurality of first electrode lines are formed; and a plurality of dot spacers formed at a touch area such that the upper film and the lower film are spaced away from each other.

At this time, at least one of the plurality of first and second electrode lines can be formed of a dual layer of silver (Ag) and Indium-Tin-Oxide (ITO). Further, at least one of the plurality of first and second electrode lines may be formed of silver (Ag). Also, at least one of the plurality of first and second electrode lines may be formed of Indium-Tin-Oxide (ITO).

The upper film and the lower film can be formed of PolyEthylene Terephthalate (PET).

According to the inventive front filter, the touch screen can include: an upper film on which a first transparent conductive layer is formed; a lower film on which a second transparent conductive layer facing the first transparent conductive layer is formed; and a plurality of dot spacers formed at the touch area such that the upper film and the lower film are spaced away from each other.

At this time, the first and second transparent conductive layers are formed of Indium-Tin-Oxide (ITO).

The inventive front filter further includes: an antireflection coating for preventing an external incident light from being again reflected toward an external; an optical characteristic film for decreasing brightness of red and green of visible ray incident from the panel and at the same time, increasing brightness of blue; and a near infrared ray shielding film for shielding near infrared ray radiated from the panel.

In another aspect of the present invention, there is provided a plasma display apparatus including: a panel formed by attaching an upper substrate and a lower substrate to each other; a front filter installed on a front surface of the panel, and having a touch screen for generating a coordinate signal with respect to a touch point; a chassis base for fixing the panel; a back cover installed on a rear surface of the panel; and a front cabinet for electrically connecting the front filter and the back cover.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
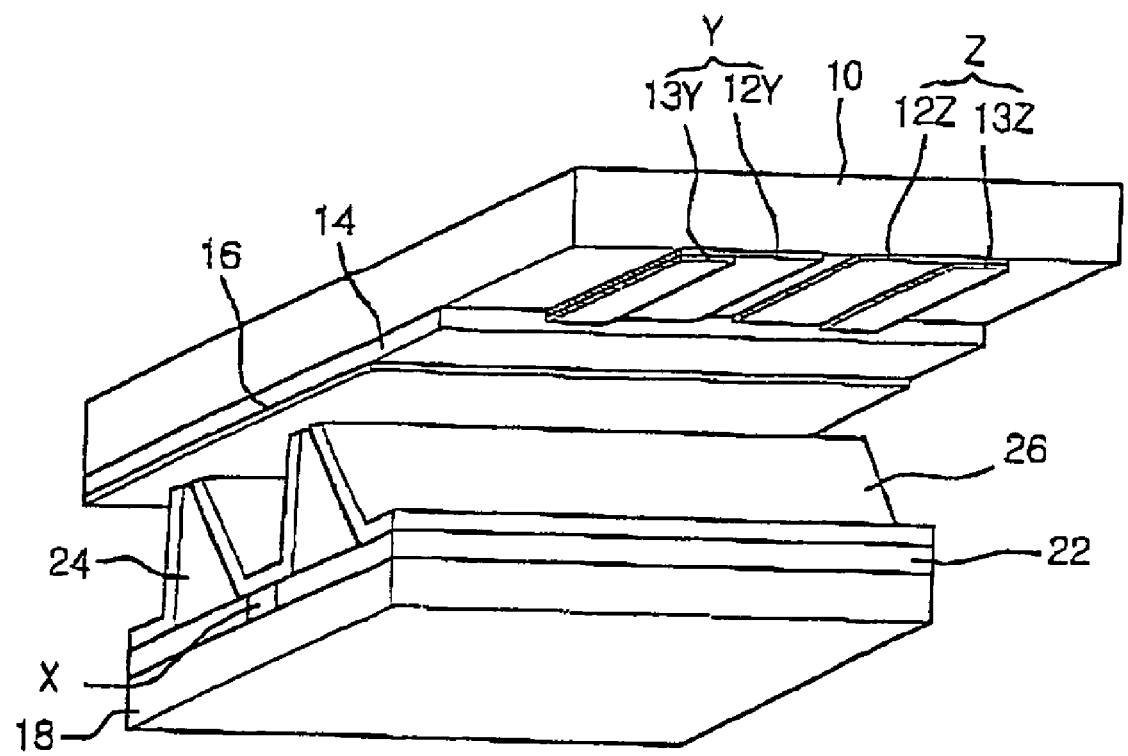
FIG. 1 is a perspective view illustrating a structure of a discharge cell of a conventional plasma display panel.
Figure 2:
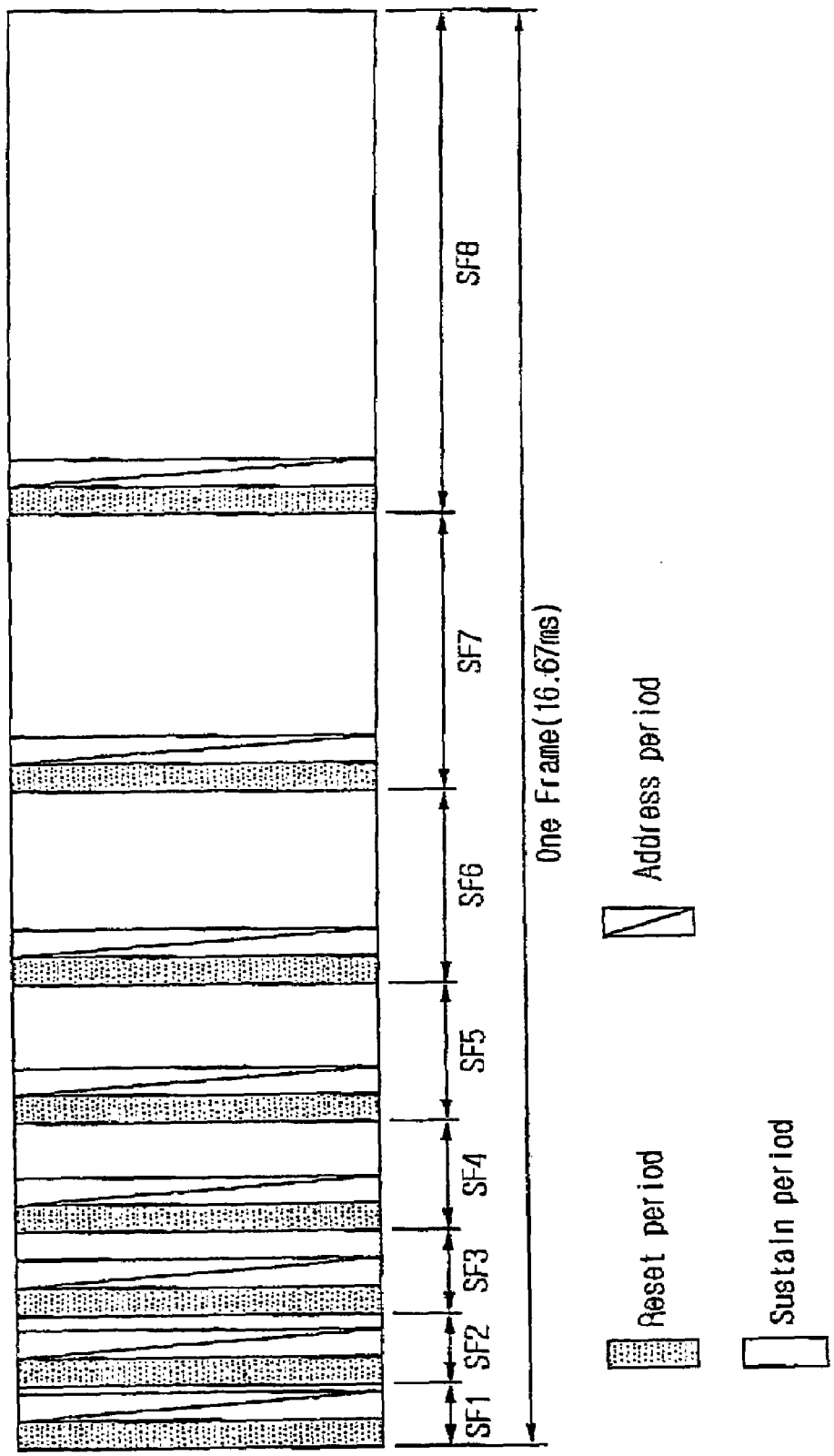
FIG. 2 is a view illustrating a frame at which a 256 gray level is expressed in a conventional plasma display panel.
Figures 3, 4:
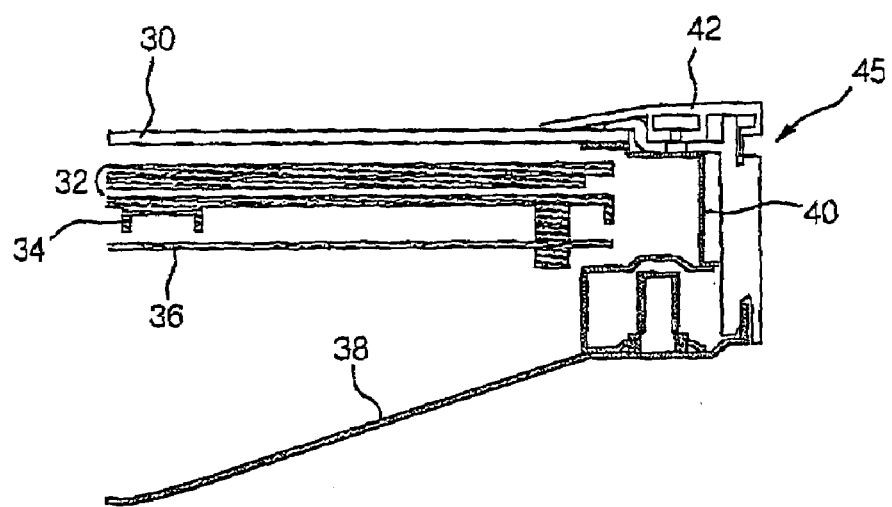
FIG. 3 is a schematic section view illustrating a portion of a conventional plasma display apparatus.
FIG. 4 is a schematic section view illustrating a front filter shown in FIG. 3.
Figure 5:
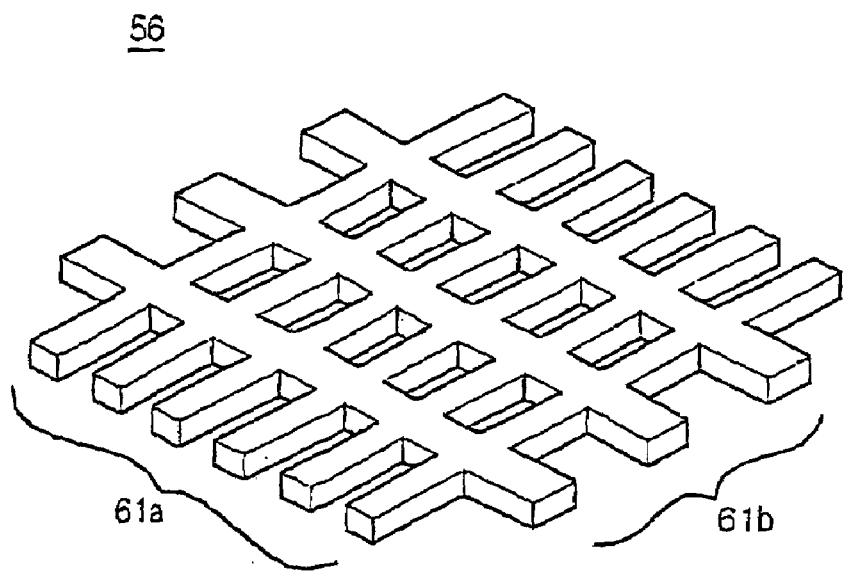
FIG. 5 is a detailed view illustrating an EMI shield film shown in FIG. 4.
Figure 6:
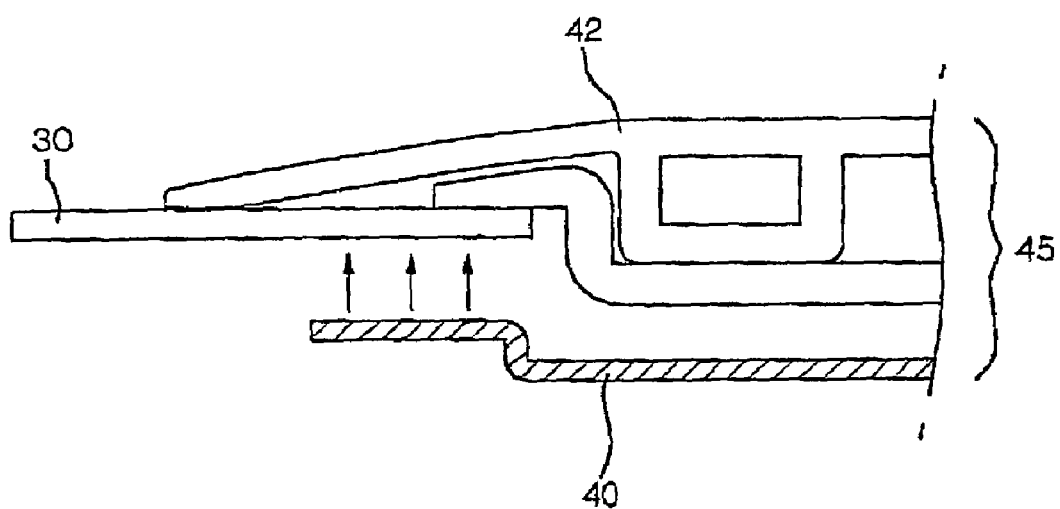
FIG. 6 is a detailed view illustrating a grounding procedure of a front filter and a filter support portion shown in FIG. 3.
Figure 7:
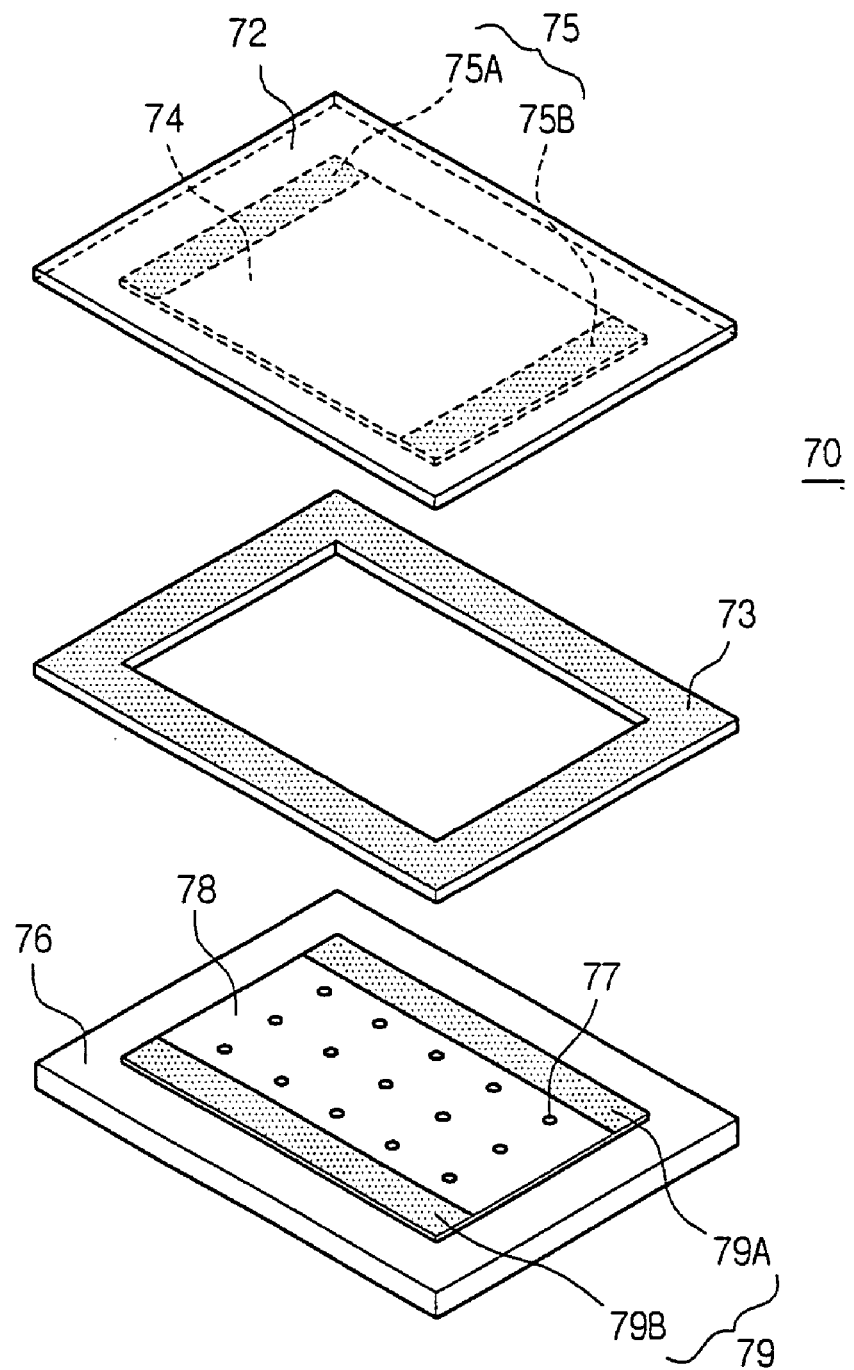
FIG. 7 is a view illustrating a structure of a conventional touch screen.
Figure 8:
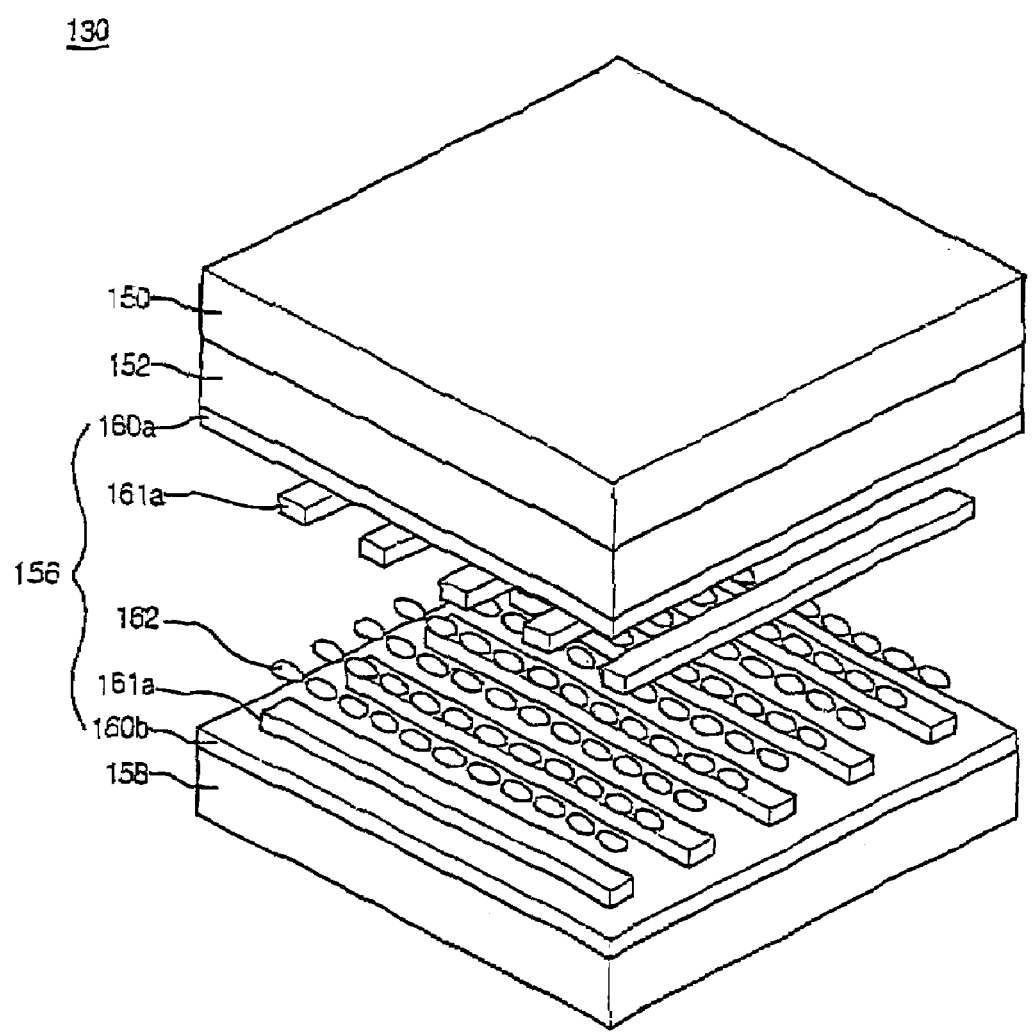
FIG. 8 is a view illustrating a front filter, of a plasma display apparatus according to a first embodiment of the present invention.

FIG. 8 is a view illustrating a front filter of a plasma display apparatus according to a first embodiment of the present invention.

Referring to FIG. 8, the front filter 130 includes an antireflection coating 150, an optical characteristic film 152, a touch screen 156, and a Near Infrared Ray (Hereinafter, referred to as "NIR") shield film 158. Herein, it is desirable that the front filter 130 is a film type filter without a glass for support.

An adhesive layer is formed between respective films 150, 152, 156 and 158 of the front filter 130 to adhere respective films 150, 152, 156 and 158 to one another. Generally, a specific substance is added to the adhesive layer to form the optical characteristic-film 152.

At this time, a structure of the front filter is a little varied depending on a manufacture enterprise. The present invention does not illustrate the adhesive layer for description convenience, and exemplifies the structure of the front filter 130 widely generally used at present.

The antireflection coating 150 prevents an external incident light from being reflected toward an external to improve a contrast of a plasma display panel (PDP). The antireflection coating 150 is formed on a surface of the front filter 130. Meanwhile, the antireflection coating 150 can be additionally formed on a rear surface of the front filter 130.

The optical characteristic film 152 functions to decrease brightness of red (R) and green (G) of visible ray incident from a panel, while it functions to increase brightness of blue (B) to improve an optical characteristic of the PDP.

The touch screen 156 shields EMI (Electromagnetic interference) to prevent the EMI incident from the panel from being emitted to the external. Describing a structure of the touch screen with reference to FIG. 9, the touch screen 156 includes an upper film 160*a* on which a plurality of first electrode lines 161*a* are formed, and a lower film 160*b* on which a plurality of second electrode lines 161*b* are formed in a direction of crossing with the plurality of first electrode lines 161*a* to face the upper film 160*a*. At this time, since the plurality of electrode lines is finely structured like a black matrix, it does not influence a picture quality. Further, the plurality of first and second electrode lines 161*a* and 161*b* arranged in a format of the black matrix as described above shields the EMI.

The upper film 160*a* and the lower film 160*b* are united by a sealant (not shown) coated along an edge portion being a non-touch area, and are spaced away from each other as much as a height of the sealant. Further, a plurality of dot spacers 162 is additionally formed on the plurality of first electrode lines 161a of the upper film 160a or the plurality of second electrode lines 161b of the lower film 160b at a touch area excepting for the non-touch area to separate the upper film 160a from the lower film 160b.

A transparent film formed of polyethylene terephthalate (PET) is mainly used as the upper film 160a pressed by a pen or a finger, and a transparent film formed of a material like the upper film 160a is used as the lower film 160b. At least one of the first and second electrode lines 161a and 161b is formed of a dual layer of silver (Ag) and Indium-Tin-Oxide (ITO). Further, at least one of the first and second electrode lines 161a and 161b is formed of silver (Ag) or Indium-Tin-oxide (ITO).

If the first electrode line 161a is in contact with the second electrode line 161b by the upper film 160a pressed by the pen or the finger, a resistance value of the touch screen 156 is varied depending on its contact position. Additionally, since current or voltage is different depending on the varied resistance value, the varied current or voltage is outputted as x-axis and Y-axis coordinate signals through an external electrode not shown connected to the first and second electrode lines 161a and 161b.

In other words, in a conventional structure of an EMI shield film having crossed and integrated first and second electrode lines, the inventive touch screen 156 separates the first electrode line 161a and the second electrode line 161b from each other to respectively form the first and second electrode lines 161a and 161b on the upper/lower films 160a and 160b. And then, the plurality of dot spacers 162 is formed between the upper film 160a and the lower film 160b. Accordingly, the touch screen 156 shields the EMI to not only prevent the EMI incident from the panel from being emitted to the external but to also perform a function of the touch screen.

The NIR shield film 158 shields the NIR radiated from the panel to prevent the NIR exceeding a reference value from being emitted to the external such that a signal transmitting device using IR (Infrared Ray) can normally transmit a signal such as a remote controller and the like.

Figure 10:
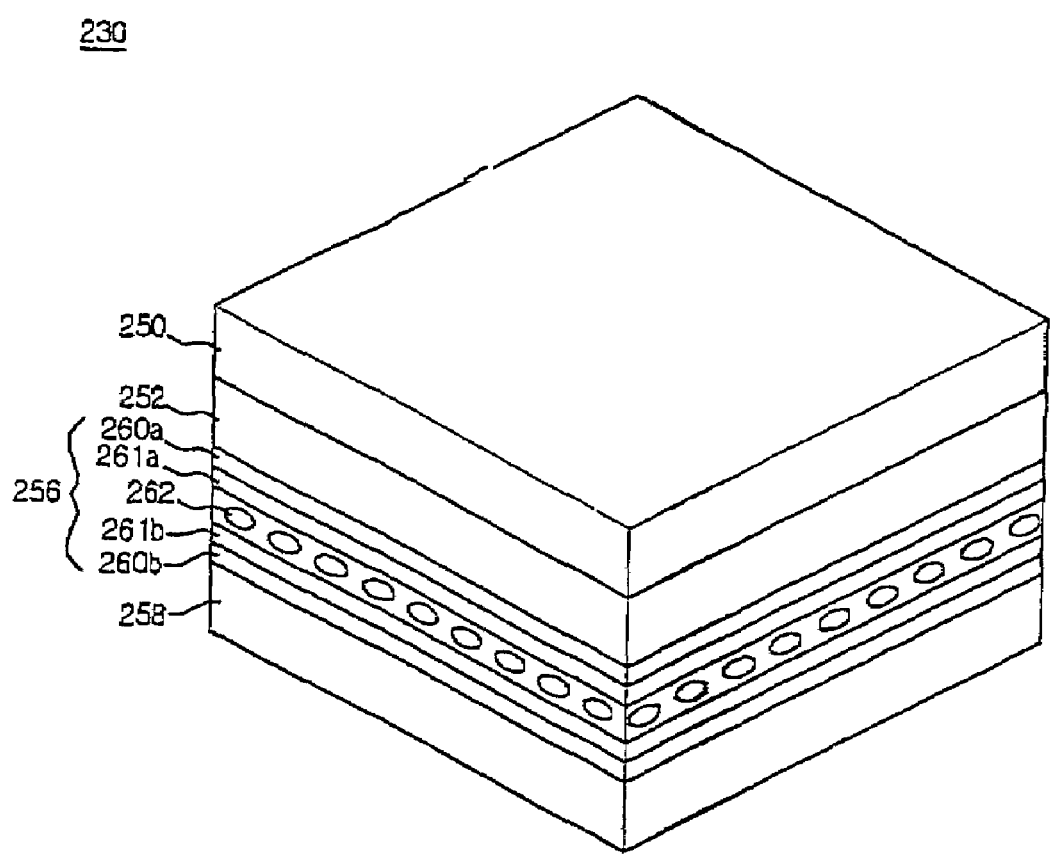
FIG. 10 is a view illustrating a front filter of a plasma display apparatus according to a second embodiment of the present invention.

FIG. 10 is a view illustrating a front filter of a plasma display apparatus according to a second embodiment of the present invention.

Referring to FIG. 10, the front filter 230 includes an antireflection coating 250, an optical characteristic film 252, a touch screen 256, and a Near Infrared Ray (Hereinafter, referred to as "NIR") shield film 258. Herein, it is desirable that the front filter 230 is a film type filter without a glass for support.

An adhesive layer is formed between respective films 250, 252, 256 and 258 of the front filter 230 to adhere respective films 250, 252, 256 and 258 to one another. Generally, a specific substance is added to the adhesive layer to form the optical characteristic film 252.

The antireflection coating 250 prevents an external incident light from being reflected toward an external to improve a contrast of a plasma display panel (PDP). The antireflection coating 250 is formed on a surface of the front filter 230. Meanwhile, the antireflection coating 250 can be additionally formed on the rear surface of the front filter 230.

The optical characteristic film 252 functions to decrease brightness of red (R) and green (G) of visible ray incident from a panel, while it functions to increase brightness of blue (B) to improve an optical characteristic of the PDP.

The touch screen 256 shields 8MI (Electromagnetic interference) to prevent the EMI incident from the panel from being emitted to the external. Describing a structure of the touch screen with reference to FIG. 11, the touch screen 256 includes an upper film 260a on which a plurality of first transparent conductive layers 261a are formed, and a lower film 260b on which a plurality of second transparent conductive layers 261b are formed in a direction of crossing with the plurality of first transparent conductive layers 261a to face the upper film 260a.

The upper film 260a and the lower film 260b are united by a sealant (not shown) coated along an edge portion being a non-touch area and are spaced away from each other as much as a height of the sealant. Further, a plurality of dot spacers 262 is additionally formed on the plurality of first transparent conductive layers 261a of the upper film 260a or the plurality of second transparent conductive layers 261b of the lower film 260b at a touch area excepting for the non-touch area to separate the upper film 260a from the lower film 260b.

A transparent film formed of polyethylene terephthalate (PET) is mainly used as the upper film 260a pressed by a pen or a finger, and a transparent film formed of a material like the upper film 260a is used as the lower film 260b. As first and second transparent conductive layers 261a and 261b, indium-tin-oxide (ITO) is used.

If the first transparent conductive layer 261a is in contact with the second transparent conductive layer 261b by the upper film 260a pressed by the pen or the finger, a resistance value of the touch screen 256 is varied depending on its contact position. Additionally, since current or voltage is different depending on the varied resistance value, the varied current or voltage is outputted as X-axis and Y-axis coordinate signals through an external electrode not shown connected to the first and second transparent conductive layers 261a and 261b.

In other words, in a conventional structure of an EMI shield film having crossed and integrated first and second transparent conductive layers, the inventive touch screen 256 separates the first transparent conductive layer 261a and the second transparent conductive layer 261b from each other to respectively form the first and second transparent conductive layers 261a and 261b on the upper/lower films 260a and 260b. And then, the plurality of dot spacers 262 is formed between the upper film 260a and the lower film 260b. Accordingly, the touch screen 256 shields the EMI to not only prevent the EMI incident from the panel from being emitted to the external, but to also perform a function of the touch screen.

The NIR shield film 258 shields the NIR radiated from the panel to prevent the NIP exceeding a reference value from being emitted to the external such that a signal transmitting device using IR (Infrared Ray) can normally transmit a signal such as a remote controller and the like.

The above-described film typed front filter has an advantage of light weight and also slim in comparison to a glass typed front filter. Further, the film typed front filter can reduce a manufacture cost in comparison to the glass typed front filter.

Since the plasma display apparatus is provided with the various-functional touch screen formed on the front filter, the present invention does not require an external separate input unit. Further, the present invention not only appeals to consumer's mentality, but also enhances a value of a high-class brand.

The present invention can also use the touch screen to add an automatic positioning and screen adjustment function, and an additional function such as color depth adjustment, resolution adjustment and brightness adjustment.

As described above, the present invention can provide the touch screen for the front filter installed in the plasma display apparatus to not only add various functions, but to also appeal to the consumer's mentality and enhance the value of the high-class brand.

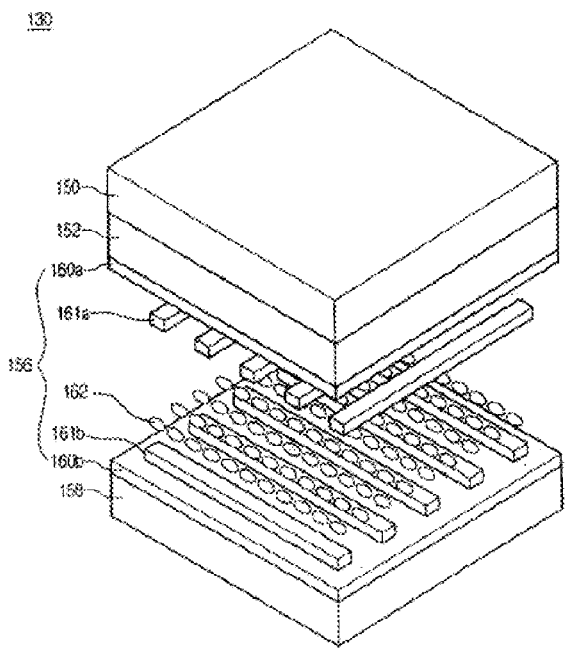

What is claimed is:

1. A front filter installed on a front surface of a panel, comprising:
   a touch screen for generating a coordinate signal with respect to a touch point,
   wherein the touch screen comprises:
   an upper film on which a plurality of first electrode lines are formed;
   a lower film on which a plurality of second electrode lines crossing the plurality of first electrode lines are formed; and
   a plurality of dot spacers formed at a touch area such that the upper film and the lower film are spaced away from each other.

2. The front filter according to claim 1, wherein the touch screen shields EMI (electromagnetic interference).

3. The front filter according to claim 1, being a film type filter.

4. The front filter according to claim 1, wherein the front filter further comprises:
   an antireflection coating for preventing an external incident light from being again reflected toward an external;
   an optical characteristic film for decreasing brightness of red and green of visible ray incident from the panel and at the same time, increasing brightness of blue; and
   a near infrared ray shielding film for shielding near infrared ray radiated from the panel.

5. The front filter according to claim 1, wherein at least one of the plurality of first and second electrode lines is formed of a dual layer of Ag (silver) and ITO (Indium-Tin-Oxide).

6. The front filter according to claim 1, wherein at least one of the plurality of first and second electrode lines is formed of Ag (silver).

7. The front filter according to claim 1, wherein at least one of the plurality of first and second electrode lines is formed of ITO (Indium-Tin-Oxide).

8. The front filter according to claim 1, wherein the upper film and the lower film are formed of PET (Polyethylene Terephthalate).

9. A plasma display apparatus comprising;
   a panel formed by attaching an upper substrate and a lower substrate to each other;
   a front filter installed on a front surface of the panel, and having a touch screen for generating a coordinate signal with respect to a touch point;
   a chassis base for fixing the panel;
   a back cover installed on a rear surface of the panel; and
   a front cabinet for electrically connecting the front filter and the back cover.

10. The plasma display apparatus according to claim 9, wherein the touch screen shields EMI (electromagnetic interference).

11. The plasma display apparatus according to claim 9, being a film type filter.

12. The plasma display apparatus according to claim 9, wherein the touch screen comprises:
    an upper film on which a plurality of first electrode lines are formed;
    a lower film on which a plurality of second electrode lines crossing the plurality of first electrode lines are formed; and
    a plurality of dot spacers formed at a touch area such that the upper-film and the lower film are spaced away from each other.

13. The plasma display apparatus according to claim 12, wherein at least one of the plurality of first and second electrode lines is formed of a dual layer of Ag (silver) and ITO (Indium-Tin-Oxide).

14. The plasma display apparatus according to claim 12, wherein at least one of the plurality of first and second electrode lines is formed of Ag. (silver) or ITO (Indium-Tin-Oxide).

15. The plasma display apparatus according to claim 12, wherein the upper film and the lower film are formed of PET (Polyethylene Terephthalate).

16. The plasma display apparatus according to claim 9, wherein the touch screen comprises:
    an upper film on which a first transparent conductive layer is formed;
    a lower film on which a second transparent conductive layer facing the first transparent conductive layer is formed; and
    a plurality of dot spacers formed at the touch area such that the upper film and the lower film are spaced away from each other.

17. The plasma display apparatus according to claim 16, wherein the first and second transparent conductive layers are formed of ITO (Indium-Tin-Oxide).

18. A front filter installed on a front surface of a panel, comprising:
    a touch screen for generating a coordinate signal with respect to a touch point; and
    an antireflection coating for preventing an external incident light from being again reflected toward an external.

19. The front filter according to claim 18, wherein the front filter further comprises: an optical characteristic film for decreasing brightness of red and green of visible ray incident from the panel and at the same time, increasing brightness of blue.

20. The front filter according to claim 18, wherein the front filter further comprises: a near infrared ray shielding film for shielding near infrared ray radiated from the panel.

21. The front filter according to claim 18, wherein the touch screen comprises:
    an upper film on which a plurality of first electrode lines are formed;
    a lower film on which a plurality of second electrode lines crossing the plurality of first electrode lines are formed; and
    a plurality of dot spacers formed at a touch area such that the upper film and the lower film are spaced away from each other.

22. The front filter according to claim 18, wherein the touch screen comprises:
    an upper film on which a first transparent conductive layer is formed;
    a lower film on which a second transparent conductive layer facing the first transparent conductive layer is formed; and
    a plurality of dot spacers formed at the touch area such that the upper film and the lower film are spaced away from each other.

* * * * *

UNITED STATES PATENT AND TRADEMARK OFFICE
CERTIFICATE OF CORRECTION

| | | |
|---|---|---|
| PATENT NO. | : 7,242,136 B2 | Page 1 of 5 |
| APPLICATION NO. | : 10/796102 | |
| DATED | : July 10, 2007 | |
| INVENTOR(S) | : Young Sung Kim | |

It is certified that error appears in the above-identified patent and that said Letters Patent is hereby corrected as shown below:

The Title Page, showing an illustrative figure, should be deleted and substitute therefor the attached Title Page.

Figure 9:
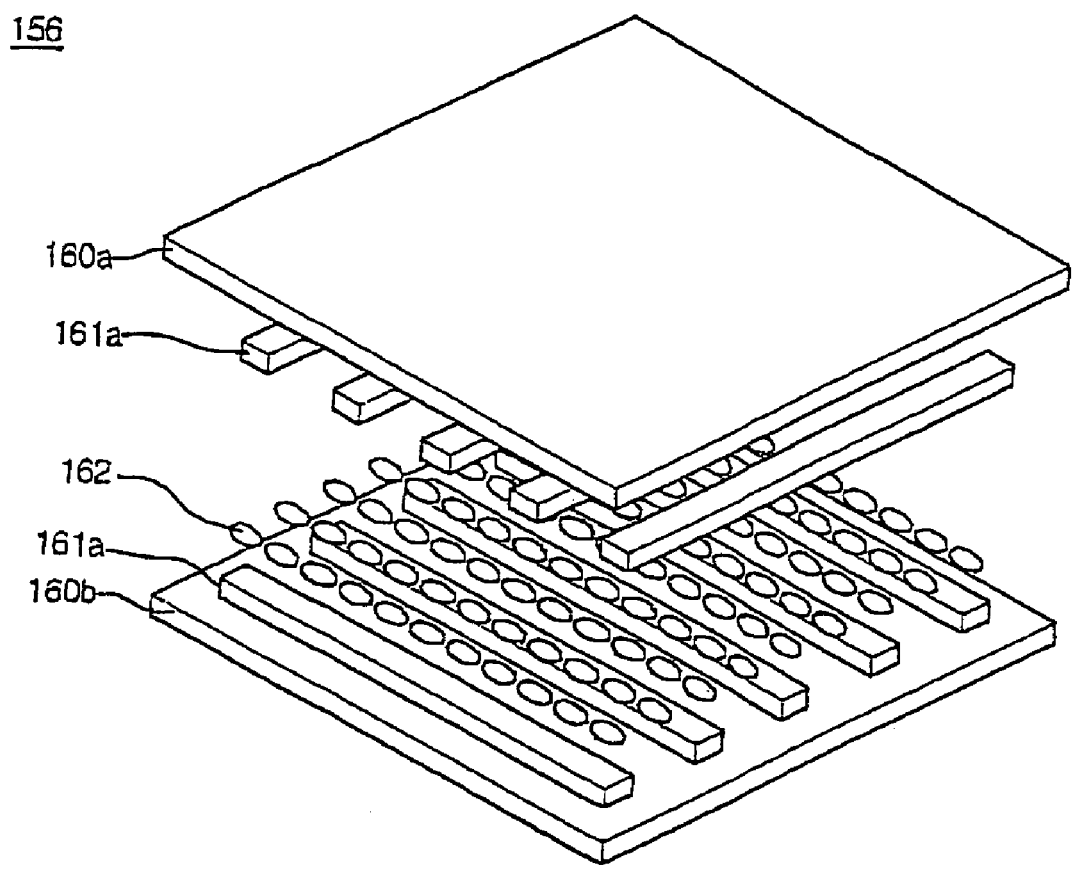
FIG. 9 is a detailed view illustrating a touch screen of FIG. 8.
Figure 11:
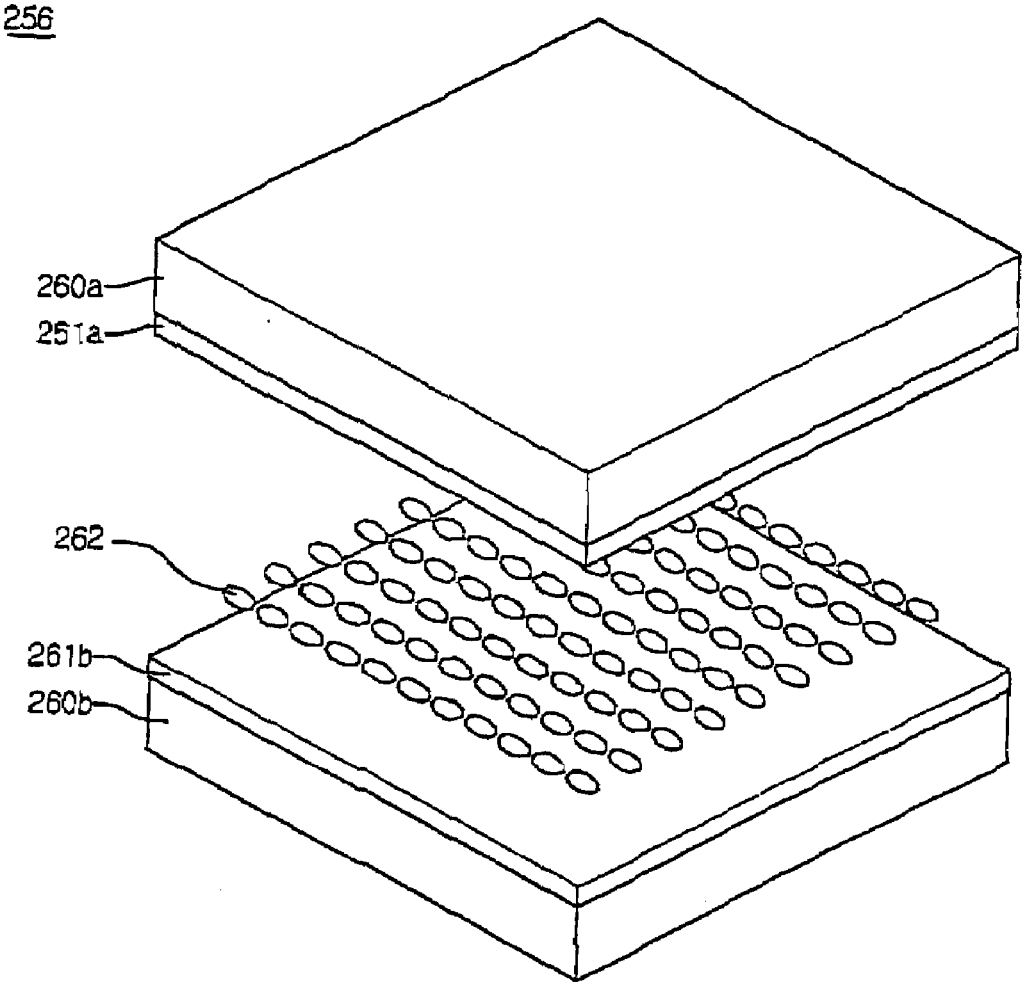
FIG. 11 is a detailed view illustrating a touch screen shown in FIG. 10.
Figure 8:
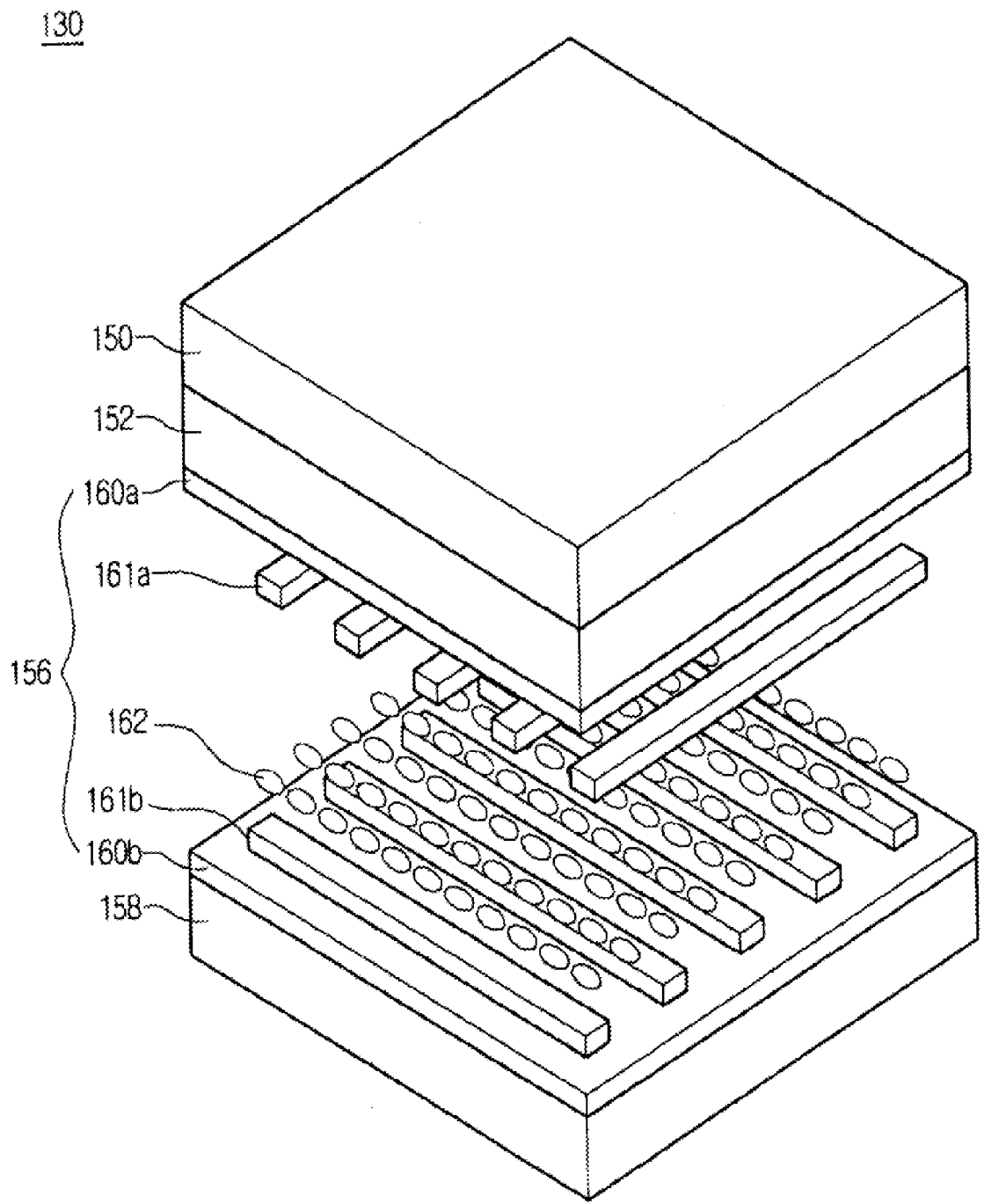
Figure 9:
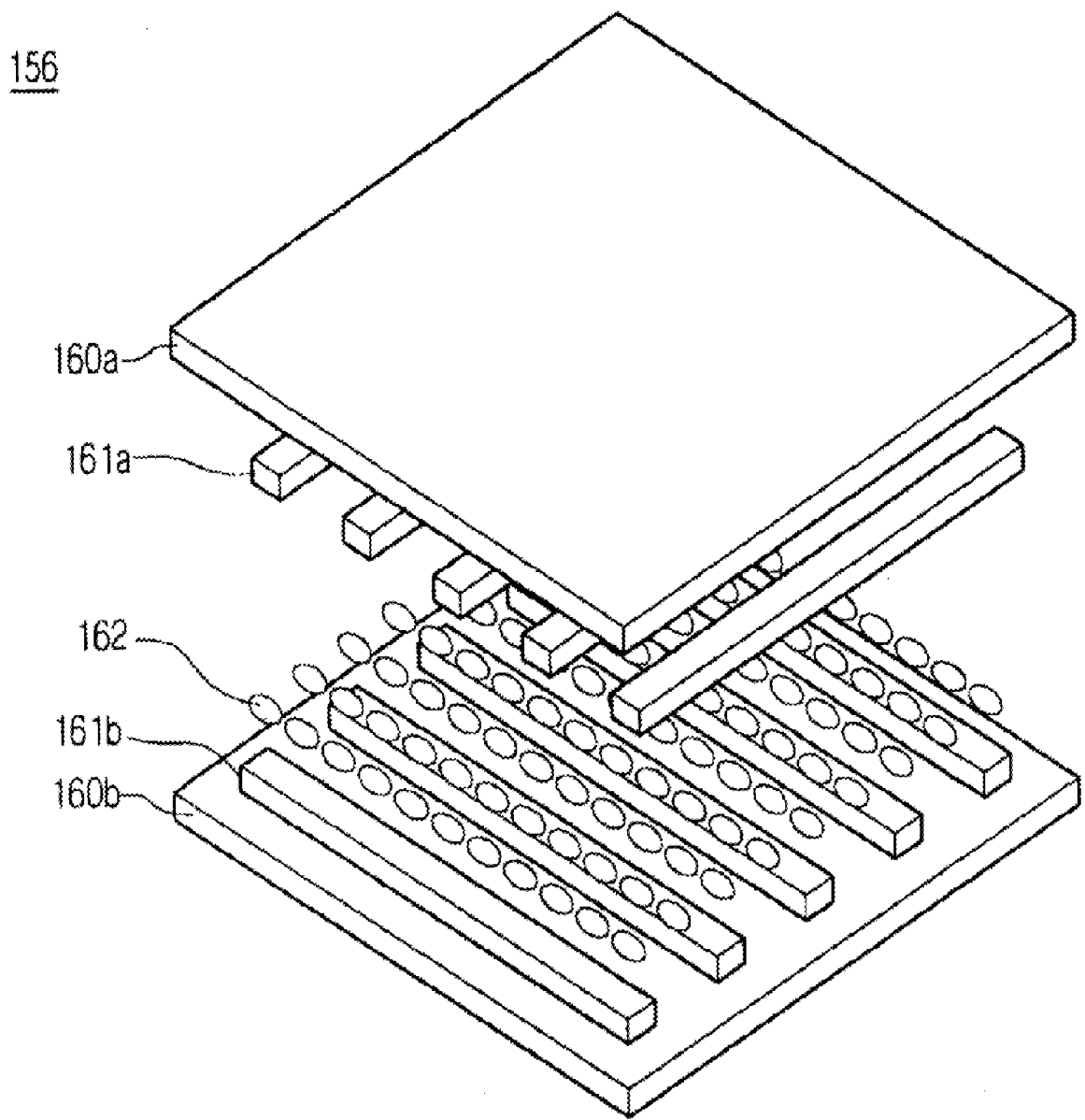
Figure 11:
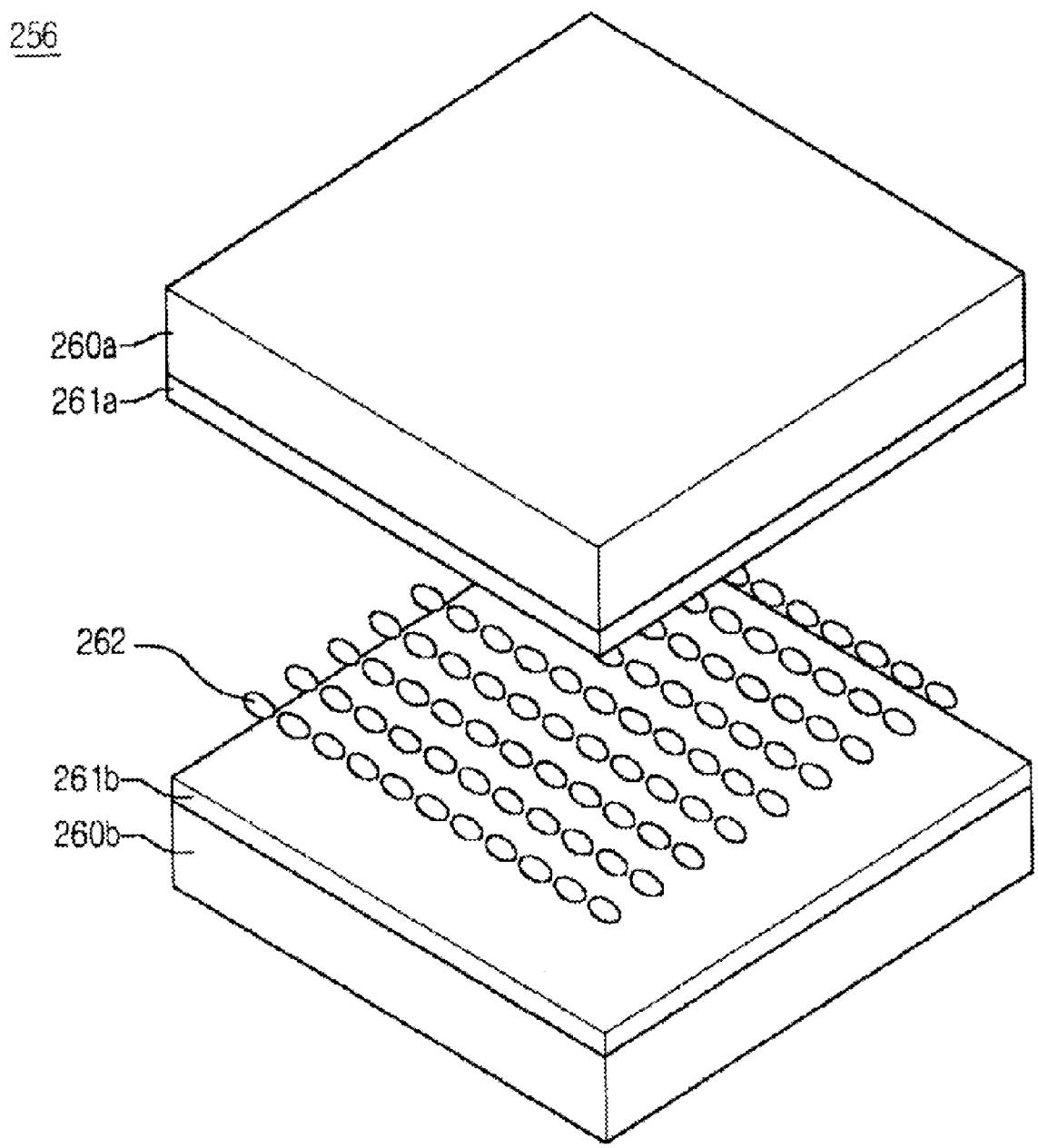

Delete drawings sheets 6 of 9, 7 of 9, and 9 of 9 and substitute therefor the drawing sheets, consisting of figs 8, 9 and 11 as shown on the attached page.

Signed and Sealed this

Twenty-second Day of July, 2008

JON W. DUDAS
*Director of the United States Patent and Trademark Office*

(12) United States Patent
Kim et al.

(10) Patent No.: US 7,242,136 B2
(45) Date of Patent: Jul. 10, 2007

(54) FRONT FILTER, AND PLASMA DISPLAY APPARATUS HAVING THE SAME

(75) Inventors: Young Sung Kim, Yongin-si (KR); Kyung Ku Kim, Seoul (KR); Hong Rae Cha, Seoul (KR); Myeong Soo Chang, Oeiwhang-si (KR); Byung Gil Ryu, Seoul (KR); Eun Ho Yoo, Goyang-si (KR)

(73) Assignee: LG Electronics Inc., Seoul (KR)

( * ) Notice: Subject to any disclaimer, the term of this patent is extended or adjusted under 35 U.S.C. 154(b) by 334 days.

(21) Appl. No.: 10/796,102

(22) Filed: Mar. 10, 2004

(65) Prior Publication Data
US 2004/0178729 A1 Sep. 16, 2004

(30) Foreign Application Priority Data
Mar. 11, 2003 (KR) .................. 10-2003-0015174

(51) Int. Cl.
*G06F 3/033* (2006.01)
*G09F 9/00* (2006.01)
*H01J 61/40* (2006.01)

(52) U.S. Cl. ............... 313/112; 313/582; 359/885; 359/577

(58) Field of Classification Search ........ 345/173–178; 178/18.01–20.06
See application file for complete search history.

(56) References Cited

U.S. PATENT DOCUMENTS

| | | | | |
|---|---|---|---|---|
| 4,794,634 A * | 12/1988 | Torihata et al. | ...... | 379/93.19 |
| 6,061,177 A * | 5/2000 | Fujimoto | ...... | 359/443 |
| 6,087,012 A * | 7/2000 | Varaprasad et al. | ...... | 428/428 |
| 6,215,477 B1* | 4/2001 | Morrison et al. | ...... | 345/173 |
| 6,876,355 B1* | 4/2005 | Ahn et al. | ...... | 345/173 |
| 6,887,631 B2* | 5/2005 | Kiguchi et al. | ...... | 430/7 |
| 6,933,086 B2* | 8/2005 | Sakurada | ...... | 430/7 |
| 7,053,886 B2* | 5/2006 | Shin | ...... | 345/173 |
| 2003/0122881 A1* | 7/2003 | Yu | ...... | 345/173 |
| 2005/0062410 A1* | 3/2005 | Bell et al. | ...... | 313/506 |

FOREIGN PATENT DOCUMENTS

JP 10-163671 * 6/1998

* cited by examiner

*Primary Examiner*—Ashok Patel
(74) *Attorney, Agent, or Firm*—Ked & Associates, LLP.

(57) ABSTRACT

The present invention relates to a front filter having a touch screen, and a plasma display apparatus having the same. The front filter installed on a front surface of a panel of a plasma display apparatus, the front filter including: a touch screen for generating a coordinate signal with respect to a touch point.

22 Claims, 9 Drawing Sheets